United States Patent
Neal et al.

(10) Patent No.: US 7,039,645 B1
(45) Date of Patent: May 2, 2006

(54) MANAGING CONTENT OF AN ELECTRONIC CATALOG BY COLLABORATION WITH ANOTHER ELECTRONIC CATALOG

(75) Inventors: Michael Renn Neal, Superior, CO (US); Ian Straub, Broomfield, CO (US); James Michael Wilmsen, Westminster, CO (US); Nathan Eric Wykes, Broomfield, CO (US)

(73) Assignee: Requisite Technology, Inc., Westminster, CO (US)

( * ) Notice: Subject to any disclaimer, the term of this patent is extended or adjusted under 35 U.S.C. 154(b) by 405 days.

(21) Appl. No.: 10/256,901

(22) Filed: Sep. 26, 2002

(51) Int. Cl.
*G06F 17/30* (2006.01)
(52) U.S. Cl. ..................... 707/101; 707/102
(58) Field of Classification Search ............ 707/1, 707/2, 3, 4, 5, 6, 7, 8, 9, 10, 100, 101, 102, 707/103 R, 104.1; 705/26, 27, 9, 80; 709/246, 709/223
See application file for complete search history.

(56) References Cited

U.S. PATENT DOCUMENTS

| | | | | |
|---|---|---|---|---|
| 5,319,542 A | 6/1994 | King, Jr. et al. | .............. | 705/27 |
| 5,870,717 A | 2/1999 | Wiecha | ...................... | 705/26 |
| 5,974,395 A | 10/1999 | Bellini et al. | .................. | 705/9 |
| 6,029,142 A | 2/2000 | Hill | .............................. | 705/27 |
| 6,141,653 A | 10/2000 | Conklin et al. | ............... | 705/80 |
| 6,169,992 B1 | 1/2001 | Beall et al. | ............. | 707/103 R |
| 6,226,675 B1 | 5/2001 | Meltzer et al. | ............. | 709/223 |
| 6,256,676 B1 | 7/2001 | Taylor et al. | ............... | 709/246 |
| 6,308,178 B1 | 10/2001 | Chang et al. | ............... | 707/100 |

FOREIGN PATENT DOCUMENTS

| | | |
|---|---|---|
| WO | WO 01/04775 A2 | 1/2001 |
| WO | WO 01/26018 A2 | 4/2001 |
| WO | WO 01/40904 A2 | 6/2001 |
| WO | WO 01/75647 A2 | 10/2001 |

*Primary Examiner*—Jeffrey A. Gaffin
*Assistant Examiner*—Yicun Wu
(74) *Attorney, Agent, or Firm*—Holland & Hart LLP; Christopher J. Kulish, Esq.

(57) ABSTRACT

The present invention allows one catalog to be managed using the content of another catalog. In one embodiment, the invention can include reading records from a plurality of different source databases, converting the records to an open format, comparing the converted records, correcting for differences in the converted records; converting the corrected records to the respective format of the corresponding source database, and writing the records back into the respective source databases. In another embodiment, the invention could include comparing the converted records to open format records from a reference database source and analyzing and correcting the converted records based on the comparison.

49 Claims, 6 Drawing Sheets

MANAGING CONTENT OF AN ELECTRONIC CATALOG BY COLLABORATION WITH ANOTHER ELECTRONIC CATALOG

BACKGROUND OF THE INVENTION

1. Field of the Invention

The present invention relates to managing the content of an electronic catalog, such as the descriptions and values of the parameters of the items in the electronic catalog. More particularly, the invention relates to analyzing the content of one electronic catalog, such as a procurement system of an Enterprise Resource Planning system, in light of another electronic catalog or a reference electronic catalog.

2. Description of the Related Art

Searchable electronic catalogs are commonly used in support of various electronic commerce and purchasing functions. These catalogs typically have a user interface for selectively retrieving and displaying records as well as a system for electronically purchasing any items that are selected. Some such electronic purchasing systems are built within complex database structures such as an Enterprise Resource Planning system. There may be aspects of the catalog stored in several different tables and even different databases, for example a vendor master, materiel master, item master and more. This type of structure, while it may be convenient when used in an Enterprise Resource Planning system, renders the catalog difficult and cumbersome to manage and maintain. It also tends to encourage and hide obsolete, redundant and conflicting information within the many tables. In order to manage and administer the items in the catalog to correct for these deficiencies, specialized tools, developed specifically for the particular hosting system, are typically required. This makes it necessary for the catalog administrator or manager to be familiar with all the particular specialized tools necessary for each database. The specialized formats and tools also make it very difficult to compare a catalog against a reference or secondary catalog. Currently, several different formats are used for catalogs and for enterprise software, so an expert with one catalog may not be able to work with another catalog.

With some hosting systems, it may be possible to convert the catalog into a more common format, operate on the catalog and then convert it back into the format of the hosting system. For example, data in an Oracle database may be convertible to a spreadsheet or text file, modified, then converted back into a replacement dataset for the Oracle database. This requires tools provided by Oracle or others to do the conversion. The common format also limits the kinds of operations and analysis that can be performed. Most of the desired operations must also be performed manually.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

DETAILED DESCRIPTION OF THE INVENTION

The present invention allows one catalog to be managed using the content of another catalog. In one embodiment, the various databases of an Enterprise Resource System are extracted into a common open format. The records of the various databases are compared, reconciled, updated and corrected. The corrected records are then converted back into the original source format and written into the original databases. The databases can be compared and supplemented based on other databases at the same or another enterprise or based on a reference database. The same transactions with the extracted data can be used to augment and correct all of the databases involved and also to supplement and correct the reference database. Extracting all of the databases to a common format and location allows for redundant and inconsistent records to quickly be isolated and eliminated.

Figure 1:
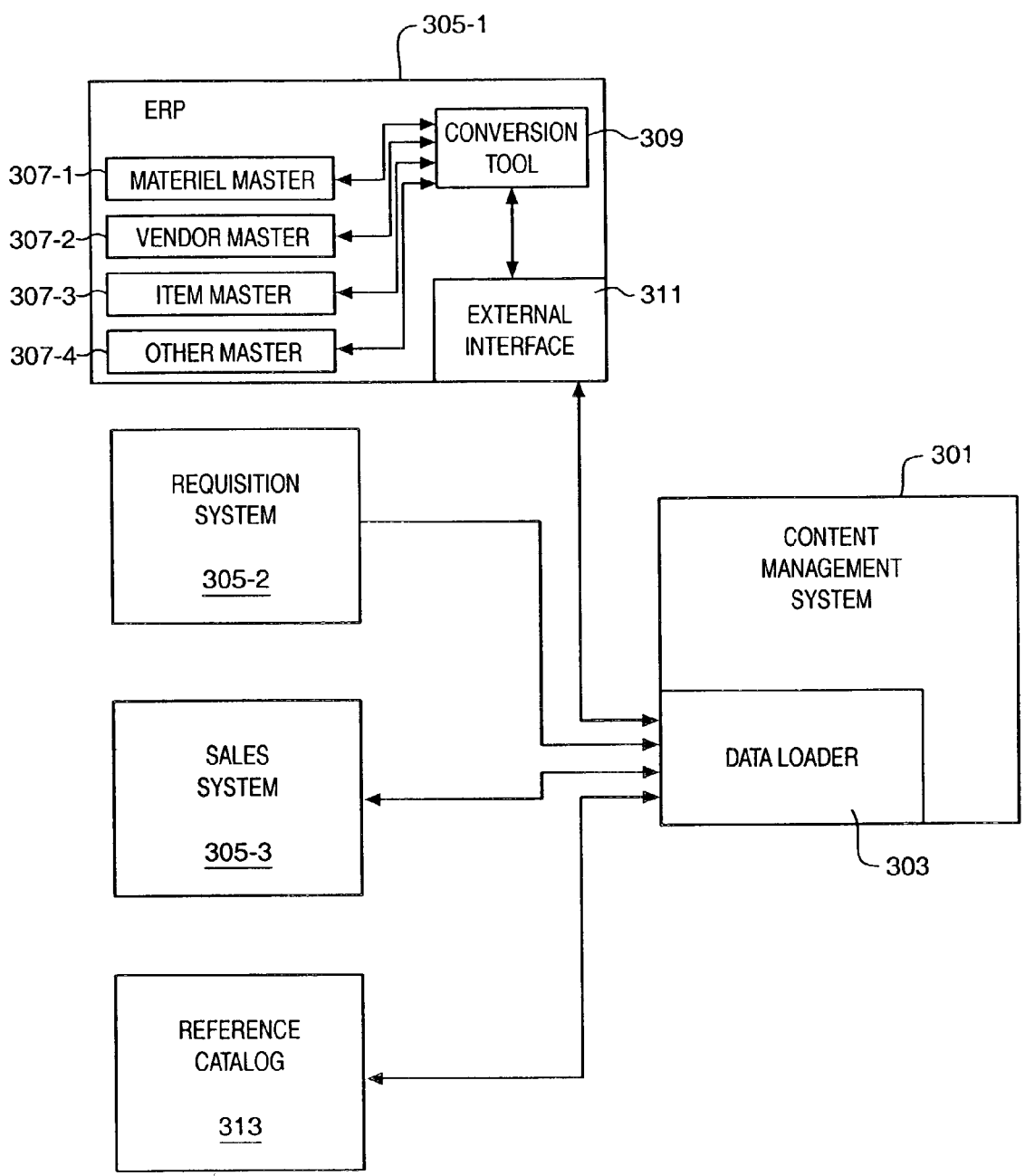
FIG. 1 is a block diagram of a content management system connected to several different databases in accordance with an embodiment of the present invention.

I. FIG. 1 shows a system for managing multiple catalogs. The catalogs can be managed with a content management system 301. The content management system can have a structure similar to that shown in FIGS. 5 and 6. In FIG. 1, however, the content management system has explicitly been augmented with a data loader 303 to interface with other catalogs and sources of data records. The requisition system of FIG. 5 also interfaces with other catalogs but the data loader and many other details have not been shown in order to simplify the diagram. Through the data loader, the content management system can be coupled to a variety of different systems.

Figure 5:
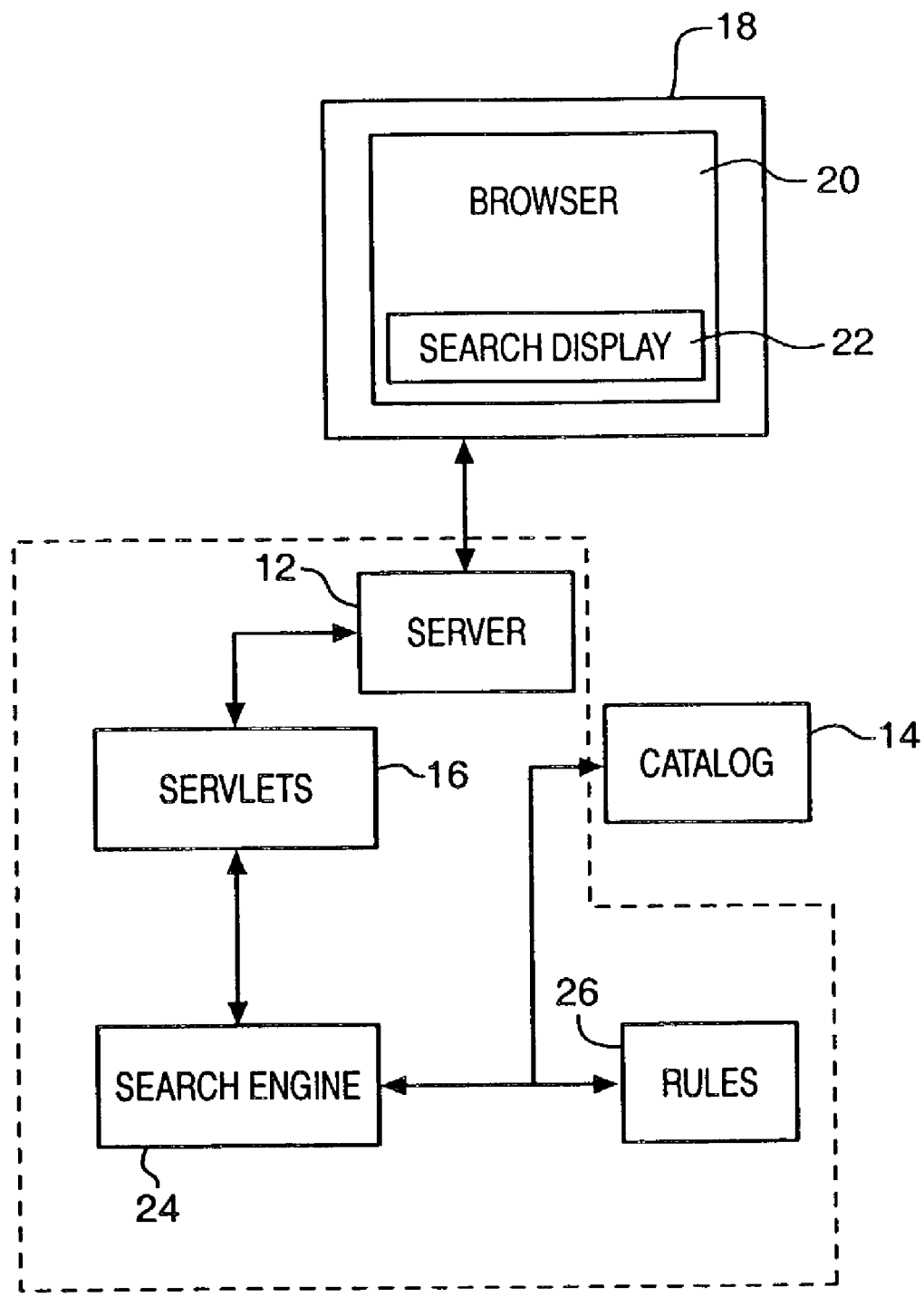
FIG. 5 is a block diagram representation of an electronic catalog system suitable for use in implementing the present invention.

An Enterprise Resource Planning (ERP) system 305-1 is coupled to the content management system through an external interface 311 of the ERP system. The ERP system includes a number of databases 307 which are independently maintained and may have different formats and configurations. The databases can include lists of products and services that are tracked for purchasing, sales, accounting, finance, inventory and a variety of other purposes. In the example of FIG. 1, these databases are a materiel master 307-1, a vendor master 307-2, an item master 307-3 and any number of other masters and other databases 307-4, although other databases are also possible in addition to or instead of the ones shown. The ERP system may have many other systems and components not shown in FIG. 1 to allow it to perform its many other functions as is well-known in the art. The database can constitute one or more of the catalogs 14 as shown in FIG. 5.

The masters are coupled to a conversion tool 309. The conversion tool takes data from the various masters and converts it from the database format of the ERP system and the particular master to a more common and open format, such as some type of delimited text. The text can be delimited by tabs, commas, paragraph marks or any other symbol. Alternatively, the open format may be in the format of a more common database or reference file such as a spreadsheet, a commercial database format or an open standards database format such as XML (Extensible Mark-up Language) text or a SQL (Standard Query Language) statement. The conversion tool can also receive data from the data loader or another source in an open format and convert it back into the format of the source database from which it originally came.

In some ERP systems, the needed data to assemble a complete record may be scattered into several different tables and different databases. The conversion tool or another tool in the system may also serve to compile the data sufficient to create a complete record before the record is converted. In another embodiment, the ERP system has no conversion tool and the conversion is performed by the content management system or an intermediary system (not shown).

Any number of additional databases can be connected to the data loader 303. These other databases may be used for purchasing 305-2, or for sales 305-3, or for any other purpose. They may correspond to marketplace catalogs, Internet sales systems, supplier or manufacturer product inventory databases or any other type of database. They may also correspond to additional ERP systems at the same or different enterprises. For instance, acquisition may cause multiple ERP systems to exist in the same company.

A reference catalog 313 can also be connected to the data loader. The reference catalog can be a complete and accurate listing of all items or it can be a developing repository that is updated as new information becomes available. The reference catalog may have less or more information than the ERP and other catalog systems. For example, it may lack information on any item's availability or price, while a supplier catalog may have information on both. The reference catalog can also have information that is not available in any one other catalog. For example, the reference catalog may have several different suppliers and supplier part numbers for a single item. While a purchaser catalog may include different suppliers for a single item, a supplier catalog probably will not.

Figure 2:
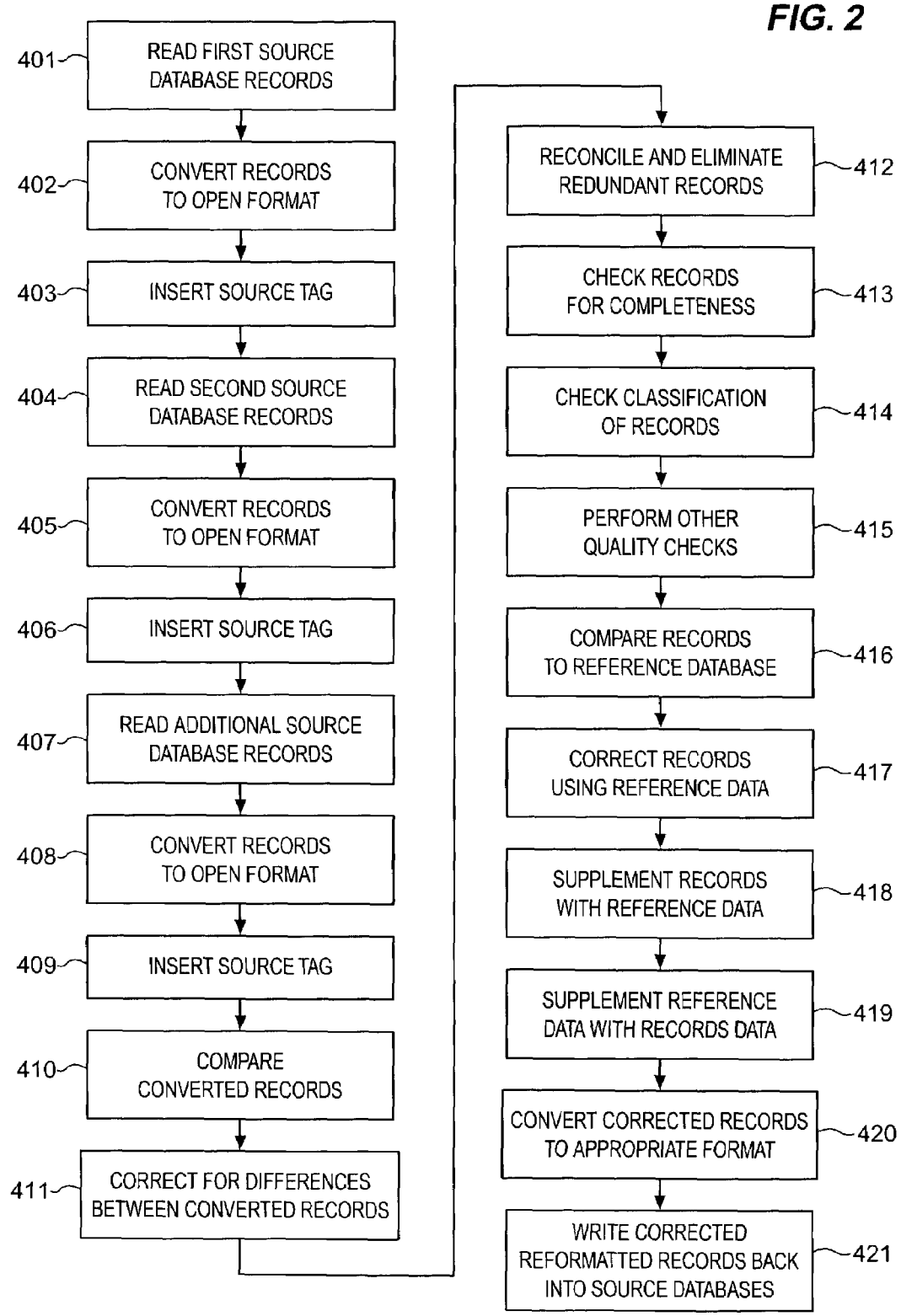
FIG. 2 is a flow diagram of managing content of an electronic catalog using another electronic catalog.

II. Referring to FIG. 2, the operation of the apparatus shown in FIG. 1 can be better understood. In one embodiment, each of the databases or masters 307 of each of the various product or service catalog systems 305 is separately maintained and operated. As mentioned above, this can lead to significant differences in the completeness and accuracy of each database. However, the databases cannot easily be reconciled against each other due first to technical obstacles and second to privacy obstacles.

The technical obstacles can be overcome by using the conversion tool to bring all of the different catalogs into a common format or into formats that allow comparisons to be made. The privacy obstacles can be overcome by bringing all of the data into a common third party location, such as the content management system 301 and then returning to each source database only the data that is appropriate to that source database. If the source databases are all maintained by the same enterprise or if there is no private data then the privacy obstacle may not exist. If all the databases are at the same enterprise and the data is freely shared, then the content management system can also be operated and maintained at that enterprise. If all of the information is freely shared, then it may be possible to generate a single complete record for each item and send the same record back to each source database.

In order to begin working with the data in the source databases, the records are read or extracted from the first source database 401. These records are then converted using the conversion tool to the open format 402. In one embodiment, the conversion tool of the ERP system is used to convert the ERP database into delimited text. This text is then converted by the data loader into XML (Extensible Mark-up Language) text according to a particular preferred structure. The XML text for each record will have an inserted source tag 403 to identify the database from which the record came. If there are no privacy concerns and all records are freely shared, then the source tag may not be needed. In another embodiment, the conversion tool provides a spreadsheet or table for the records or an open standards database.

The intermediate format of the converted data is not important provided that it can be recognized and handled by the data loader. The conversion tool is typically bundled with the source database and the offered conversion choices will be controlled by the source database provider. In such an event, the data loader can be configured to finish the conversion into a preferred format that can be used for all the different source databases. In one embodiment, all the data records from all the sources are converted from all the intermediate formats into the same XML format. In another embodiment, the formats differ and an interface enables comparisons. The data loader can also provide the converted records in a spreadsheet or database format instead of XML.

Additional records can be read from a second source database 404 and these records can be converted to the same or a compatible open format 405. Source tags can be inserted as appropriate 406. Additional records can also be read from third, fourth and still more additional source databases 407 and converted into the open format 408. Source tags are inserted as appropriate 409. FIG. 2 shows at least four source databases for the ERP system and two further databases. The number of databases used will depend on system capacity and other configuration issues. In one embodiment, all of the records are converted and merged together into a single collection of records. In another embodiment, the records are operated upon in database pairs until all of the databases have been examined.

Having gathered all of the records from all of the sources together, they can then be compared to each other 410 and evaluated individually as described more fully below. The converted records can be compared to each other to find records missing from any one of the source databases, to find data missing from within a particular record and to identify discrepancies. Missing items in one source database can be copied into the respective source database from one of the other source databases or from a reference catalog. Checks can be inserted so that items are not added if the item is not appropriate for the target database. The source tags can be used to determine which items are added to which database.

There are a number of different checks that can be performed. One basic check is to correct for differences between the converted records for the same item 411. Items can be matched by referring to some value that should be the same in each database. One such value may be the SKU (Stock Keeping Unit), other useful values are the manufacturer's part No. and the supplier's part No. There may also be other values that can be used to determine whether records in different databases refer to the same item. These differences between data records for identical items can be flagged for inspection or changed to agree with any one of the source databases. One of the databases can be selected as a reference database or a controlling database and any inconsistencies can be conformed to that database. For example, one of the databases can be a supplier's or manufacturer's database. This database can be designated as controlling and any missing or differing entries in any record can be filled in with the supplier's data.

The content management system can also reconcile and eliminate redundant records 412. Any one database may have several entries for the same item. These can be identified using, for example a SKU and the records can be merged together. The data from each of the redundant records can be combined to create a record with all of the data that was available. The other redundant records for the item can then be deleted.

The content management system may have many other tools available for managing, analyzing, and improving the quality of the databases. Before or after the processes mentioned above, the records can be checked for completeness 413. A completeness score can indicate how many items are missing from the database or how much descriptive information is missing from items that are in the database or both. This may result in a general score to assess the need for rebuilding the database or the usability of the databases. A source database that is missing a significant amount of data can be replaced by a database from another source, upgraded by filling in data from a reference database or simply flagged as deficient.

In addition, a number of accuracy checks can be made. The checks may be manual, statistical or performed using a reference, master or dominant source. For example, the classification of the records can be checked 414 to ensure that like items are classified together. The organization of descriptive information can also be checked to ensure that values for weight are linked to a weight attribute. Attributes and categories for items can be moved and modified and values for items can be deleted, modified and adjusted.

There are also a number of other quality checks that can be performed 415. These quality checks can result in corrections, alerts or scores. Any one database can be tested for data normalization, completeness, consistency and comprehensibility, for example. Completeness relates to whether the descriptions of the items provide enough information to allow them to be selected, ordered, supplied and paid for. A database can be made more complete by filling in missing parameter information. Consistency relates to how complete records are for different items. A database in which all of the items and all types of items are described in a similar level of detail will be consistent. Comprehensibility relates to the accuracy of the language, units and formats of the values in the data records.

In addition to the comparisons mentioned above, or as an alternative, the gathered data records can be compared to a reference database 416. If there is no reference database, then one can be built by compiling all of the data available for each item using the processes described above. With each new database evaluated, the reference database can grow to include more items. In another embodiment, the reference database has already been compiled and is ready for use in correcting the data records from the source databases. By first extracting the data records and then comparing them to records in the reference database, several benefits are obtained.

First, after the item records are corrected, it is possible to send only the same items back to the source database. If the source database-had not been investigated, there would be no way to select which items should be written into the source database. Second, the source database may include data that is not available in the reference database. This data may include such things as negotiated discounts, preferred status, departmental approvals, or internal uses of the item. By supplementing and correcting the source database records this unique information can be preserved. Third, the extracted data can be used to supplement the reference catalog, if appropriate.

Once the records have been compared they can be corrected using the reference data from the reference database 417. In addition, any missing information can be supplemented or filled in using the reference data 418. Conversely, as mentioned above, the reference database can be supplemented with any additional data from the source database records to the extent that it is appropriate 419. At some point, it is also possible to add or delete items from the source database records. If, for example, the source database includes records available from a particular supplier and the supplier has discontinued that item, then the item can be deleted from the database. Alternatively, if the supplier has added new items that would be appropriate for the source catalog, then those items can be added to the source database records. The new items can be selected by reference to the existing items. A source database containing a selection of Bic brand pens costing between $0.75 and $1.20 could be expanded by adding the newest available Bic brand pens in that price range from the same supplier or by adding the corresponding line of Paper Mate brand pens from the same supplier. Such updates provide value to the supplier and the owner of the source catalog.

Once the source database records have been brought to the quality level desired from all of the processes discussed above, the data records can be restored to their original source. By referring to the source tags, the data loader can convert the corrected records back to an appropriate intermediate format, such as delimited text, or a spreadsheet and send the data back to the appropriate origination point. At the origin, the data records can then be converted back to the appropriate database format from which they originated 420. Having been converted, the corrected reformatted records can be written back into the corresponding source databases 421. As mentioned above, it is not important to the invention exactly where the translations and conversions are performed nor which agent performs them. All conversion can be done at the content management system, at the database system or by an intermediate agent.

Figure 3:
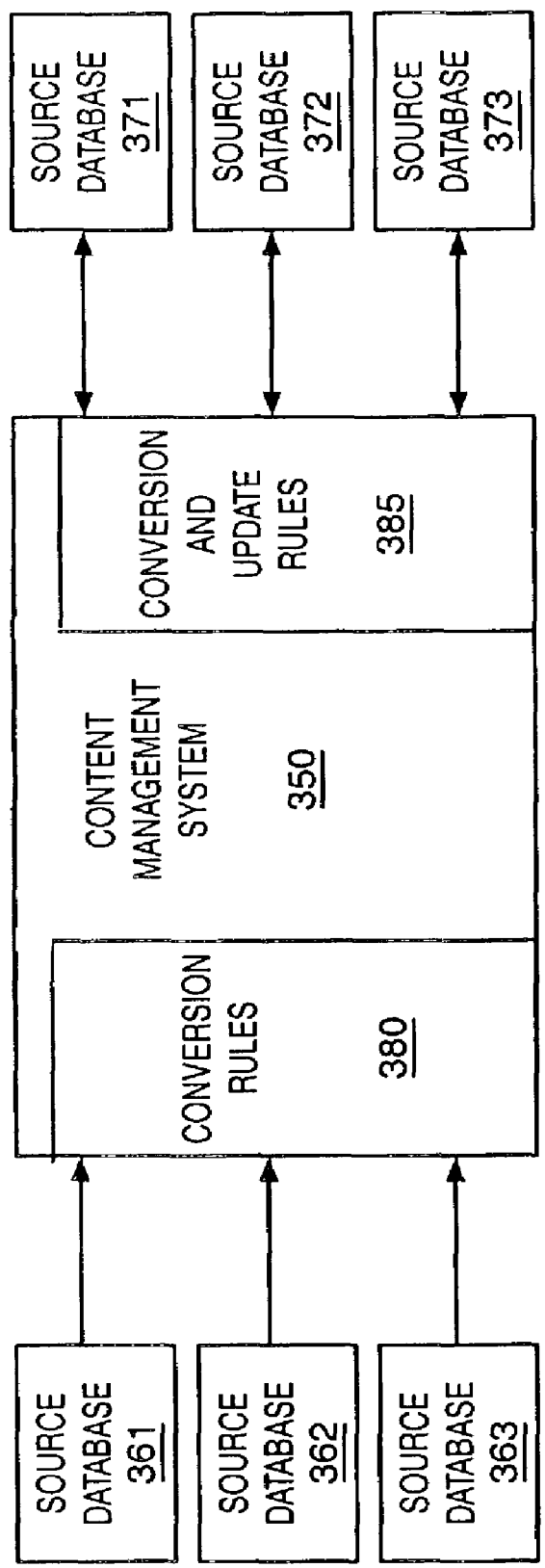
FIG. 3 is a block diagram of a content management system with conversion and update rules in accordance with an embodiment of the present invention.

III. According to one embodiment of the invention, the content management system may have update and conversion rules. This will be described in further detail with reference to FIG. 3. In this embodiment, the content management system 350 includes Update Rules 380, and Conversion and Update Rules 385.

Each of the source databases 361, 362, 363, 371, 372, 373 may have their own taxonomies including different categories and attributes. Additionally, each source database may be in different formats, such as xml, text, relational database, or other legacy format. One set of source databases 361, 362, 363 may only provide data to the content management system. A different set of source databases 371, 372, 373 may provide data and receive updates from the content management system. For example, suppliers of items in an electronic catalog may only provide their data to the content management system, but buyers of items may provide their data and receive updates of their data from the content management system.

Data from each source database may be converted into the master taxonomy and open format of the content management system using Conversion Rules. Conversion Rules may include rules mapping the different taxonomies of the source databases to the master taxonomy utilized by the content management system. Attributes that do not have a direct mapping into the master taxonomy may be put into separate fields so that no data is lost. However, attribute information that is specific to the source system may not be converted.

Conversion Rules may also include rules converting the formats utilized by the source databases to an open format. Records that cannot be automatically converted may be routed to a failed workflow system. The owner of the database may be notified of the failed conversion via email.

After the records have been converted into the open format and master taxonomy of the content management system, the records may be compared, reconciled, updated, and corrected as described in other parts of this application. Updates may include addition of new records, supplementing existing records with additional information, modifying records, or deleting records. The owner of the source databases may designate Update Rules specifying which types of updates are allowed. Update rules may also specify which type of updates may be automated and which updates require manual acceptance. Updates to records that require manual acceptance may be routed through a workflow system to the database owner. The database owner may then choose to accept or reject the updates.

Figure 4:
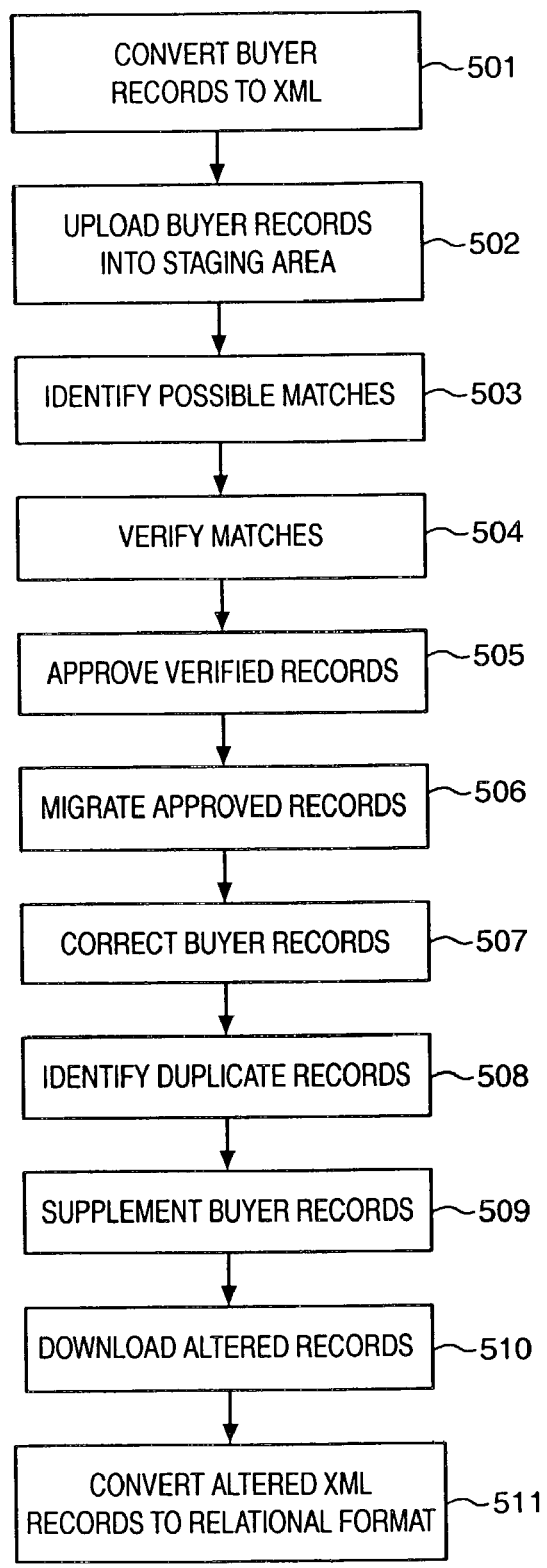
FIG. 4 is a flow diagram of a representative example of managing content of an electronic catalog using another electronic catalog.

IV. Referring to FIG. 4, a specific embodiment of the apparatus will now be explained. In this embodiment, a buyer has a legacy database containing information on products the buyer purchases. The legacy database can be, for example, an Oracle Corporation relational database that is incorporated into an ERP system. A partial list of exemplary records contained in the buyer's database is illustrated in Table A.

TABLE A

| Supplier | Part # | Manufacturer | Description | Price |
|---|---|---|---|---|
| ABC | 1234 | Bic | blue pen | $0.75 |
| ABC | 1325 | Bic | blue pen | $1.20 |
| ABC | 12444 | Bic | red pen | $0.75 |
| ABC | 1244 | Bic | red pen | $0.75 |

Using a conversion tool, such as Requisite Technology's Materiel Master Link, the records in the legacy database are converted to XML 501. The converted records are then uploaded into a customer staging area of the content management system 502. The staging area is used to help ensure the integrity of the data records in a reference database of the content management system.

Possible matches between the records in the staging area and the records in the reference database of the content management system are then identified 503. Several different algorithms may be used to identify possible matches. These algorithms may include: an exact match on the part number, a fuzzy algorithm match on the part number, and a fuzzy algorithm match on the description. Other matching algorithms may also be used.

The records in the staging area may have one or more possible matches in the reference database. After the possible matches are identified, the supplier verifies the matches 504. Alternately, if a one-to-one match is found, the record in the staging area could be automatically verified.

An attribute of the records in the staging area is then marked approved 505. Approved records can then be migrated into the reference database 506. Thus, the information that was in the buyer's database can be used to supplement the reference database of the content management system.

After the matches are verified, corrections can be made to the buyer's records 507. Duplicate records are also identified 508. Finally, information can be extracted from the reference database to supplement the information in the buyer's records 509.

After the changes have been made to the buyer's records, the records can be downloaded to the buyer 510. The records can then be reconverted from XML to the relational database format used by the buyer 510. The same conversion tool used to convert the records to XML 501 could be used to convert the records back. Alternately, a different conversion tool could be utilized.

Table B illustrates examples of alterations that could be made to the buyer's records by the content management system. The part number of the blue felt tip pen has been corrected. The duplicate red ballpoint pen record with the invalid part number has been removed. The descriptions of all three pens have been supplemented with the additional descriptive information found in the reference database.

TABLE B

| Supplier | Part # | Manufacturer | Description | Price |
|---|---|---|---|---|
| ABC | 1234 | Bic | Round Stic ™ blue ballpoint pen | $0.75 |
| ABC | 1235 | Bic | Softfeel ® FineStyle ™ blue felt tip pen | $1.20 |
| ABC | 1244 | Bic | Round Stic ™ red ballpoint pen | $0.75 |

V. FIG. 5 is a functional block diagram representation of an electronic catalog and automated purchase requisition system. An application server 12 is connected to interact with a database 14 in the form of an electronic catalog which resides in a computer memory storage device at the server or at another device. The catalog can be integrated with the server, co-located with the server or connected using a local or wide area network connection. Users of the system have workstations or clients 18 that are connected to the application server 12 through a local or wide area network such as the Internet or an intranet. The client includes a browser 20 such as a common Internet web browser or dedicated software through which the workstation communicates with the server 12 to render a search display 22. Commands entered into the web browser software can cause information to be extracted from the database 14 and displayed at the workstation 18 in the search display or in some other display.

While the invention will be described in terms of browsers communicating using typical web interfaces such as HTTP (Hyper Text Transfer Protocol) and Java instructions, the present invention does not rely on any particular platform or interface. The invention can use web-type browser software or software that has been developed specifically for the purposes of the present invention with unique code, interfaces and display technologies. The invention can be implemented on a single machine or with any kind of distributed processing environment from mainframes with dumb terminals to wireless servers with mobile radio PDA's (Personal Digital Assistant).

The database 14 is an electronic catalog of products or services. The database 14 can be constructed using a uniform catalog schema so that each product has a single database record that includes all of its different suppliers. However, multiple catalogs, one or more for each supplier, or an aggregated catalog, an aggregate of product information from multiple suppliers, can also be used. In the aggregated catalog, the same item may be listed several times in inconsistent ways.

In one embodiment of the invention, the server 12 uses servlets 16 to operate a search engine 24 that accesses one or more electronic catalogs 14. The search engine is a common and useful application of the present invention, however the present invention can be used whenever records are retrieved from the catalog. It can be used to generate a catalog to be published whether to a marketplace, a purchaser or a seller. It can also be used for any direct product purchase and for any other use of catalog records, such as system administration, management and quality control.

In the search engine example, the application server 12 queries the database 14 through the search engine and directs the results to the workstation 18. The type or format of the catalog is irrelevant as long as the catalog will respond appropriately to a query from the search engine 24. For example, the catalog may reside within a relational database or may reside within an object-oriented database. The catalog can be stored on a disk drive, a tape drive, RAM, or any other computer data storage devices. The application server 12 may reside in a computer attached directly to the storage device, or alternatively may be connected to the storage device 16 through a network. In one embodiment, the servlets are based on Java APIs (Application Program Interface) and JavaScript/HTML (Hyper Text Markup Language) Interface Generation. These use JDBC (Java Database Connectivity) to communicate through the search engine to a separate data store where the catalog resides. The JDBC protocol allows the search engine to communicate with a catalog based on a variety of different commonly used databases including those available from Oracle Corp., Microsoft Corp., and SAP AG.

The search engine 24 is also connected to a rules store 26 through similar Java or HTTP-type protocols. The rules store contains rules that are used to configure, modify or present data that has been requested by the user. As an alternative to the rules store, the rules can be incorporated into the catalog. In one embodiment, the catalog is in the form of XML (Extensible Markup Language) statements and these statements can include values for attributes of catalog items or rules about how to determine values of catalog items. Other types of markup languages, such as SGML (Standard Generalized Markup Language) and HTML (Hyper Text Markup Language) can be used as can other types of database formats.

Figure 6:
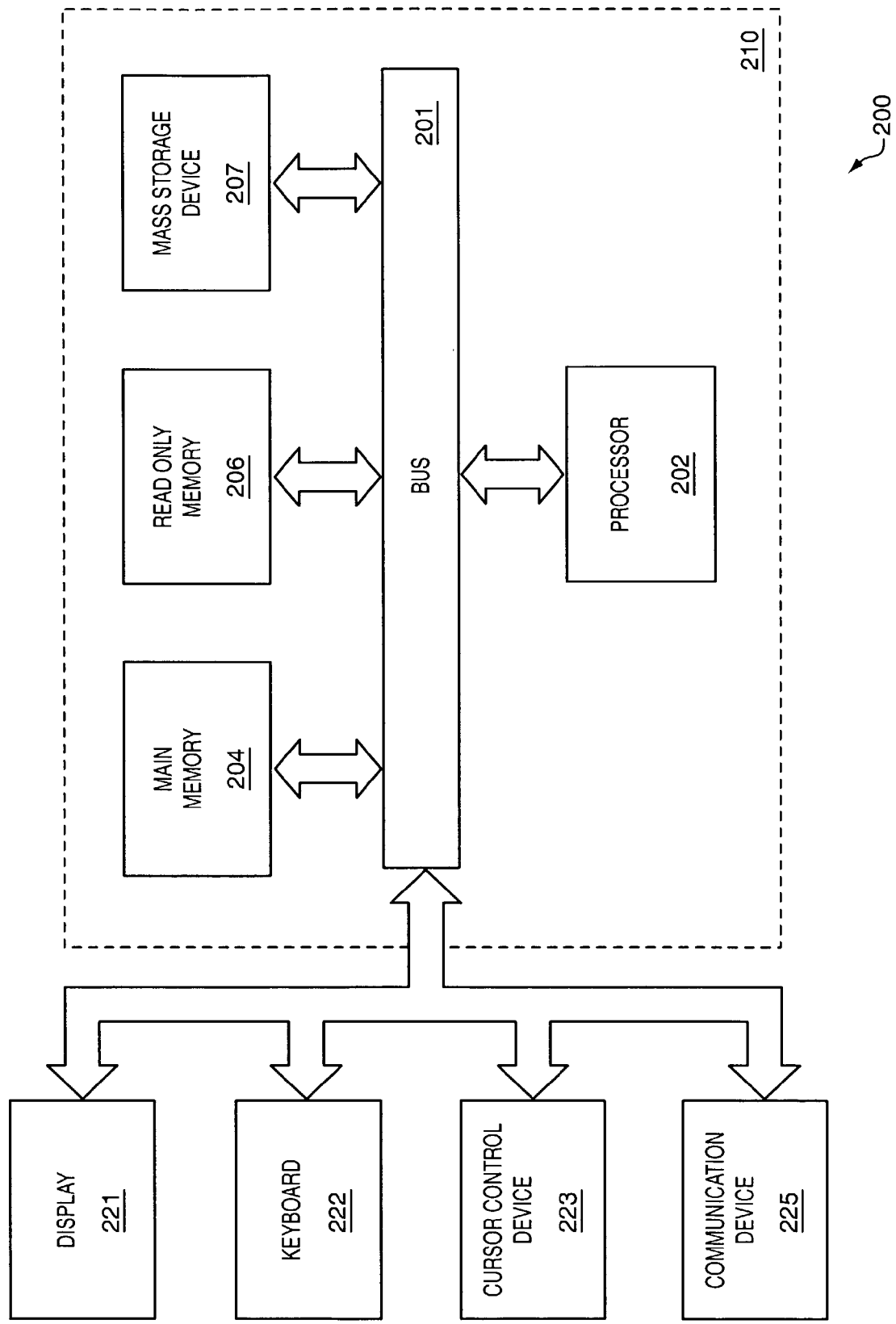
FIG. 6 is a block diagram of a representative example of a computer system suitable for implementing the present invention.

A computer system 200 representing an example of a system upon which features of the present invention may be implemented is shown in FIG. 6. The workstation, search engine, servers, and databases of FIG. 5 will typically be configured similar to what is shown in FIG. 6. Each of these components can be provided using its own computer system or several different components can be combined. For example, the search engine, server, rules, and catalog can all be provided using a single computer system. The computer system can be deployed on a single platform as shown, or different components can be provided on separate platforms so that the bus 201 connects several different platforms together containing different portions or aspects of the mass storage 207 and other system 210 components. The computer system can also be implemented in one or more small portable platforms such as laptops and PDA's.

The computer system 200 includes a bus or other communication means 201 for communicating information, and a processing means such as a microprocessor 202 coupled with the bus 201 for processing information. The computer system 200 further includes a main memory 204, such as a random access memory (RAM) or other dynamic data storage device, coupled to the bus 201 for storing information and instructions to be executed by the processor 202. The main memory also may be used for storing temporary variables or other intermediate information during execution of instructions by the processor.

The computer system may also include a nonvolatile memory 206, such as a read only memory (ROM) or other static data storage device coupled to the bus for storing static information and instructions for the processor. A mass memory 207 such as a magnetic disk or optical disc and its corresponding drive may also be coupled to the bus of the computer system for storing information and instructions such as the various databases.

The computer system can also be coupled via the bus to a display device or monitor 221, such as a cathode ray tube (CRT) or Liquid Crystal Display (LCD), for displaying information to a user. For example, graphical and textual indications of installation status, operations status and other information may be presented to the user on the display device. Typically, an alphanumeric input device 222, such as a keyboard with alphanumeric, function and other keys, may be coupled to the bus for communicating information and command selections to the processor. A cursor control input device 223, such as a mouse, a trackball, or cursor direction keys can be coupled to the bus for communicating direction information and command selections to the processor and to control cursor movement on the display 221.

A communication device 225 is also coupled to the bus 201. The communication device 225 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. Source Content and the databases can be made available to the computer system in this way.

It is to be appreciated that a lesser or more equipped computer system than the example described above may be preferred for certain implementations. Therefore, the configuration of the exemplary computer system 200 will vary from implementation to implementation depending upon numerous factors, such as price constraints, performance requirements, technological improvements, or other circumstances.

It should be noted that, while the steps described herein may be performed under the control of a programmed processor, such as the processor 202, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to externally supplied attributes of office supplies, the method and apparatus described herein are equally applicable to externally supplied attributes for any other types of electronic catalogs and of any other types of items including documents, and data files. In addition, while the invention has been described in terms of an electronic catalog, other types of ordered information stored in an electronic form can benefit from the present invention.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

The invention claimed is:

1. A method comprising:
   reading records from a source database having a first format;
   converting the records to a metadata text format, each converted record receiving a tag indicating the source database from which the record was obtained;
   resolving differences between the converted records and a reference database by altering at least some of the converted records based on data in the reference database;
   reconverting the converted records to the first format after altering based on the tag; and
   writing the reconverted records back into the source database.

2. The method of claim 1, further comprising reconciling and eliminating redundant records for an item by combining the data from the redundant records into one record and eliminating other redundant records for the item.

3. The method of claim 1, wherein converting the records comprises converting the records to delimited text and converting the delimited text to a metadata text format.

4. The method of claim 1, further comprising supplementing the converted records with additional records from a reference database.

5. The method of claim 4, further comprising supplementing the reference database with data from the converted records.

6. The method of claim 1, further comprising analyzing and correcting the converted records.

7. The method of claim 1, further comprising reclassifying at least some of the converted records.

8. The method of claim 7, wherein reclassifying comprises reclassifying the records with a master taxonomy by utilizing a mapping from a taxonomy of the source database to the master taxonomy.

9. The method of claim 1, wherein resolving differences comprises:
   determining differences between the reference database and the converted records;
   examining one or more update rules to determine allowable alterations to the converted records;
   altering at least some of the converted records based on the differences and the update rules.

10. A method comprising:
    reading records from a source database, the source database having a first format;
    converting the records to an open format, each converted record receiving a tag indicating the source from which the record was obtained;
    analyzing and correcting the converted records;
    converting the corrected records to the format of the source database based on the source database tag; and
    writing the records back into the source database.

11. The method of claim 10, wherein the source databases are integrated into a single Enterprise Resource Planning system.

12. The method of claim 10, wherein the source databases are integrated into different Enterprise Resource Planning systems.

13. The method of claim 10, further comprising:
    reading a second set of records from a second source database, the second source database having a second format;
    converting the second set to an open format;
    comparing the converted records; and
    correcting for differences in the converted records.

14. The method of claim 13, wherein analyzing and correcting comprises supplementing data from a record from the first source database with data from a record from the second source database.

15. The method of claim 10, wherein converting the records comprises converting the first format records to delimited text using a tool of the source database and converting the delimited text to the open format.

16. The method of claim 10, wherein the open format comprises a metadata text format.

17. The method of claim 10, wherein analyzing and correcting comprises reconciling and eliminating redundant records.

18. The method of claim 10, wherein analyzing and correcting comprises reclassifying at least some of the data records.

19. The method of claim 18, wherein reclassifying comprises reclassifying the records with a master taxonomy by utilizing a mapping from a taxonomy of the source database to the master taxonomy.

20. The method of claim 10, wherein analyzing and correcting comprises:
examining one or more update rules to determine allowable alterations to the converted records;
altering at least some of the converted records based on the analyzing and the update rules.

21. The method of claim 10, further comprising comparing the converted records to open format records from a reference database; and wherein the analyzing and correcting comprises analyzing and correcting the converted records based on the comparison.

22. The method of claim 21, wherein analyzing and correcting comprises supplementing the records with data from the reference database.

23. The method of claim 21, further comprising supplementing the reference database with data from the converted records.

24. The method of claim 21, further comprising resolving differences between the converted records and records of the reference database and supplementing the reference database based on the resolved differences.

25. The method of claim 10, further comprising analyzing the converted records for a quality and correcting the converted records based on the analysis.

26. The method of claim 25, wherein the quality comprises at least one of completeness, consistency, and comprehensibility.

27. The method of claim 10, wherein analyzing and correcting comprises checking records for completeness and completing at least some missing data.

28. The method of claim 10, wherein correcting comprises supplementing data from a record from one source database with data from a record from another source database.

29. An apparatus comprising:
a data loader to receive records from a plurality of source databases, the data loader converting the received records to an open format and tagging the converted records with a source database identification;
a content management system to receive records from the data loader, the content management system comparing the converted records and correcting for differences in the converted records;
wherein the data loader is further operable to convert the corrected records to the respective format of the corresponding source database based on the source database identification and to write the records back into the respective source databases.

30. The apparatus of claim 29, further comprising a reference database, wherein the content management system is further to resolve differences between the converted records and records of the reference database and to supplement the reference database based on the resolved differences.

31. The apparatus of claim 29, further comprising a conversion tool to convert the records of at least one of the plurality of source databases into an intermediate format, the conversion tool transferring the records in the intermediate format to the data loader, receiving corrected records from the data loader, and converting the corrected records to the respective format of the corresponding source database.

32. The apparatus of claim 29, further comprising one or more mappings mapping the respective taxonomies of the source databases to a master taxonomy, and wherein the data loader further reclassifies the records with the master taxonomy by utilizing the one or more mappings.

33. The apparatus of claim 29, further comprising update rules to control updates to the source database.

34. An apparatus comprising:
a plurality of source databases, each source database having a plurality of records; and
an external interface to read records from one or more of the source databases, convert the records to an open format and tag the converted records with a source database identification, send the converted records to a content management system, to receive analyzed and corrected records from the content management system, to convert the analyzed and corrected records back to the respective source database format based on the source database identification, and to write the analyzed and corrected records to their respective source database.

35. The apparatus of claim 34, further comprising a conversion tool to convert the plurality of records to an intermediate format.

36. The apparatus of claim 34, wherein the analyzed and corrected records comprise records supplemented with additional information.

37. The apparatus of claim 34, wherein the analyzed and corrected records comprise records supplemented with additional records.

38. The apparatus of claim 34, wherein the analyzed and corrected records comprise records wherein at least one redundant record has been deleted.

39. The apparatus of claim 34, wherein the analyzed and corrected records comprise records from one source database supplemented with data from records from another source database.

40. The apparatus of claim 34, wherein the different source databases are in different formats.

41. A machine-readable medium having stored thereon data representing sequences of instructions which, when executed by a machine, cause the machine to perform operations comprising:
reading records from a source database, the source database having a first format;
converting the records to an open format; each record including a source database identification indicating the source from which the record was obtained;
analyzing and correcting the converted records;
converting the corrected records to the format of the source database based on the included source database identification; and
writing the records back into the source database.

42. The medium of claim 41, wherein the instructions for analyzing and correcting comprise instructions which when executed by the machine, cause the machine to perform further operations comprising reconciling and eliminating redundant records.

43. The medium of claim 41, further comprising instructions which, when executed by the machine, cause the machine to perform operations comprising:
reading a second set of records from a second source database, the second source database having a second format;
converting the second set to an open format;
comparing the converted records; and
correcting for differences in the converted records.

44. The medium of claim 43, wherein the instructions for analyzing and correcting comprise instructions which when executed by the machine, cause the machine source database with data from a record from the second source database.

45. The medium of claim 41, wherein the instructions for converting the records comprise instructions which when executed by the machine, cause the machine to perform further operations comprising converting the read records to delimited text using a tool of the respective source database and converting the delimited text to the open format.

46. The medium of claim 41, wherein the instructions for analyzing and correcting comprise instructions which when executed by the machine, cause the machine to perform further operations comprising checking records for completeness and completing at least some missing data.

47. The medium of claim 41, wherein the instructions for analyzing and correcting comprise instructions which when executed by the machine, cause the machine to perform further operations comprising reclassifying at least some of the data records.

48. The medium of claim 41, further comprising instructions which, when executed by the machine, cause the machine to perform further operations comprising analyzing the converted records for a quality and correcting the converted records based on the analysis.

49. The medium of claim 41, wherein the instructions for analyzing and correcting comprise instructions which when executed by the machine, cause the machine to perform further operations comprising comparing the converted records to a reference database and supplementing the records with data from the reference database.

* * * * *

UNITED STATES PATENT AND TRADEMARK OFFICE
CERTIFICATE OF CORRECTION

PATENT NO. : 7,039,645 B1  Page 1 of 1
APPLICATION NO. : 10/256901
DATED : May 2, 2006
INVENTOR(S) : Neal et al.

It is certified that error appears in the above-identified patent and that said Letters Patent is hereby corrected as shown below:

Front page, under section (56) References Cited - U.S. Patent Documents, insert the following references:

-- 6,195,658 B1  *   2/2001  Comito et al. .....................707/6
   6,578,030 B1  *   6/2003  Wilmsen et al. ..................707/3
   6,792,431 B2  *   9/2004  Tamboli et al. ...................707/102
   6,832,219 B2  * 12/2004  Lal et al. ...........................707/3
   6,853,997 B2  *   2/2005  Wotring et al. ...................707/100--.

Signed and Sealed this

Fifteenth Day of May, 2007

JON W. DUDAS
*Director of the United States Patent and Trademark Office*